(12) United States Patent
Ushinohama

(10) Patent No.: US 11,842,092 B2
(45) Date of Patent: Dec. 12, 2023

(54) VIDEO CONFERENCE SYSTEM SERVER CAPABLE OF UPLOADING AND DOWNLOADING FILES, METHOD OF CONTROLLING SAME, AND STORAGE MEDIUM

(71) Applicant: CANON KABUSHIKI KAISHA, Tokyo (JP)

(72) Inventor: Takuya Ushinohama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 17/523,837

(22) Filed: Nov. 10, 2021

(65) Prior Publication Data

US 2022/0171579 A1 Jun. 2, 2022

(30) Foreign Application Priority Data

Nov. 27, 2020 (JP) .................................. 2020-197083

(51) Int. Cl.
*H04L 65/403* (2022.01)
*G06F 3/12* (2006.01)

(52) U.S. Cl.
CPC .......... *G06F 3/1207* (2013.01); *G06F 3/1268* (2013.01); *H04L 65/403* (2013.01)

(58) Field of Classification Search
CPC .... G06F 3/1268; G06F 3/1207; G06F 3/1285; H04L 65/1089; H04L 65/403; H04L 65/4025
USPC ........................................... 348/14.01–14.16
See application file for complete search history.

(56) References Cited

U.S. PATENT DOCUMENTS

| 6,489,980 | B1 * | 12/2002 | Scott ..................... G06F 16/958 |
| | | | 707/E17.116 |
| 8,964,206 | B2 | 2/2015 | Doui ....................... G06F 3/121 |
| 2014/0129522 | A1 * | 5/2014 | Bhogal ................ G06F 16/178 |
| | | | 707/626 |
| 2015/0304254 | A1 * | 10/2015 | Arai ....................... H04L 51/214 |
| | | | 709/206 |
| 2018/0070049 | A1 * | 3/2018 | Pinheiro e Mota .... H04N 7/147 |

(Continued)

FOREIGN PATENT DOCUMENTS

| JP | 2010004407 A | * | 1/2010 |
| JP | 2013-159107 | | 8/2013 |
| JP | 2020-052481 | | 4/2020 |

*Primary Examiner* — Melur Ramakrishnaiah
(74) *Attorney, Agent, or Firm* — Venable LLP

(57) ABSTRACT

A video conference system server that manages a video conference performed by using a plurality of communication terminals. When data is uploaded, based on an instruction from a first user using a first communication terminal as one of the plurality of communication terminals, from the first communication terminal, the uploaded data is downloaded based on an instruction from a second user using a second communication terminal, to the second communication terminal. A print completion notification of the uploaded data is received from the second communication terminal. When the print completion notification is received, a message that the second user has completed printing of the uploaded data is displayed on a screen of the video conference of a communication terminal, out of the plurality of communication terminals, which is used by a notification destination user, set in advance, out of participants of the video conference.

6 Claims, 14 Drawing Sheets

(56) References Cited

U.S. PATENT DOCUMENTS

2020/0099799 A1  3/2020  Obayashi .............. G06F 3/1204
2021/0097293 A1* 4/2021  Avrionov ............ G06F 3/04842

* cited by examiner

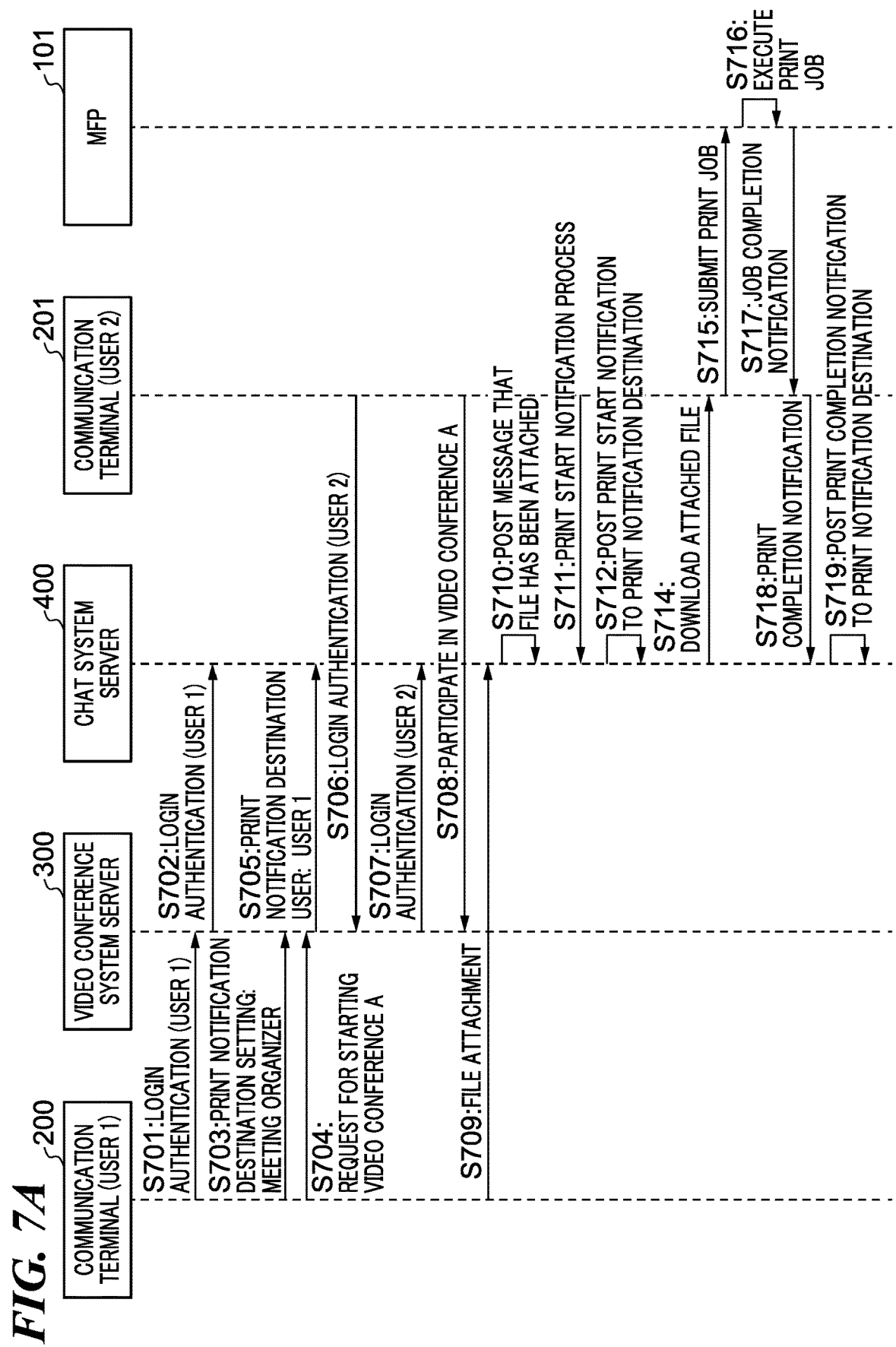

FIG. 11

| VIDEO CONFERENCE ID | PARTICIPANTS | GROUP ID | PRINT NOTIFICATION DESTINATION SETTING | PRINT NOTIFICATION DESTINATION USER |
|---|---|---|---|---|
| VIDEO CONFERENCE A | USER 1, USER 2, USER 3, USER 4 | GROUP A | GROUP OWNER | USER 1 |
| VIDEO CONFERENCE B | USER 7, USER 8, GUEST 10 | NONE | MEETING ORGANIZER | USER 5 |
| VIDEO CONFERENCE C | USER 5, USER 6, USER 7, GUEST 11 | GROUP B | PRESENTER | GUEST 2 |

| ROOM ID | GROUP ID | PARTICIPANTS |
|---|---|---|
| ROOM A | GROUP A | USER 1, USER 2, USER 3, USER 4 |
| ROOM B | NONE | USER 5, USER 6, USER 7 |

| GROUP ID | GROUP OWNER | USER LIST |
|---|---|---|
| GROUP A | USER 1 | USER 1, USER 2, USER 3, USER 4 |
| GROUP B | USER 5 | USER 5, USER 6, USER 7 |
| GROUP C | USER 1 | USER 1, USER 8, USER 10 |
| ... | ... | ... |

VIDEO CONFERENCE SYSTEM SERVER CAPABLE OF UPLOADING AND DOWNLOADING FILES, METHOD OF CONTROLLING SAME, AND STORAGE MEDIUM

BACKGROUND OF THE INVENTION

Field of the Invention

The present invention relates to a video conference system server, a method of controlling the same, and a storage medium, and more particularly to a video conference system server capable of uploading and downloading files, a method of controlling the same, and a storage medium.

Description of the Related Art

A video conference system has come into widespread use that performs a video conference by connecting communication terminals, such as a personal computer (PC) and a smartphone, to a network, e.g. due to telework or remote work, cost reduction requirement, etc. In the video conference, information can be shared not only by using voice speech, but also by displaying a video photographed by a camera connected to a communication terminal or a video displayed on a display of a communication terminal, on a remote communication terminal (terminal existing in a remote site). However, in a case where a presenter shares a material only by using a video displayed on an information terminal, attendees cannot confirm the material at a timing other than a timing at which the presenter displays the material. Further, if the display size of a communication terminal of an attendee is small, it is difficult for the attendee to view the material, which may prevent the presenter and the attendee from sufficiently sharing the information. On the other hand, if the attendee can print the material, the attendee can view a desired page of the material at a desired timing, and further, the visibility of the material can be increased, and hence it is possible to more smoothly share the information.

The video conference system is generally equipped with a chat function and a file attaching function (function which can upload and download files), and participants of a video conference are capable of exchanging messages by chat and sharing electronic files.

Japanese Laid-Open Patent Publication (Kokai) No. 2020-52481 discloses a chatbot system that is configured to, in a case where a user posts a message that the user has submitted a document and a message requesting all members of a chat group to print the document, to a chat, cause printers associated with the respective members to print the document. With this, a presenter of a video conference can instruct attendees to print a material, and hence it is possible to more smoothly share information.

Further, Japanese Laid-Open Patent Publication (Kokai) No. 2013-159107 discloses a print system configured such that assuming that a submitter who submits a print job to a printer designates in advance a user different from himself/herself as a receiver of a print product, when the print product is output from the printer according to an instruction of the receiver, completion of processing of the print job is notified to the submitter. This enables the submitter to confirm whether or not the processing of the print job issued by himself/herself is completed without inquiring the receiver.

However, in Japanese Laid-Open Patent Publication (Kokai) No. 2020-52481, the presenter of the video conference is required to post not only a message that the presenter has submitted a document but also a message requesting all members of the chat group to print the document, which interferes with presentation. Further, although the attendees of the video conference can voluntarily execute printing of the document in a state in which only the former message has been posted, even in this case, the presenter is required to inquire all of the attendees of the video conference about whether or not printing of the document has been executed.

Similarly, in Japanese Laid-Open Patent Publication (Kokai) No. 2013-159107, the presenter of the video conference is required to not only submit a print job to the printer, but also designate a receiver, which is troublesome. Further, each attendee of the video conference can independently instruct the printer to output a print product even when he/she is not designated as a receiver, but in this case, completion of processing of the print job is not notified to the presenter.

SUMMARY OF THE INVENTION

The present invention provides a video conference system server that enables a presenter of a video conference to confirm whether or not each participant has printed data uploaded for presentation without inquiring the participant, a method of controlling the same, and a storage medium.

In a first aspect of the present invention, there is provided a video conference system server that manages a video conference performed by using a plurality of communication terminals, including a data transfer unit configured to download, when data is uploaded, based on an instruction from a first user using a first communication terminal which is one of the plurality of communication terminals, from the first communication terminal, the uploaded data, based on an instruction from a second user using a second communication terminal which is another one of the plurality of communication terminals, to the second communication terminal, a print completion notification reception unit configured to receive a print completion notification of the uploaded data from the second communication terminal, and a message display unit configured to display, when the print completion notification is received, a message to the effect that the second user has completed printing of the uploaded data, on a screen of the video conference of a communication terminal, out of the plurality of communication terminals, which is used by a notification destination user, set in advance, out of participants of the video conference.

In a second aspect of the present invention, there is provided a method of controlling a video conference system server that manages a video conference performed by using a plurality of communication terminals, including downloading, when data is uploaded, based on an instruction from a first user using a first communication terminal which is one of the plurality of communication terminals, from the first communication terminal, the uploaded data, based on an instruction from a second user using a second communication terminal which is another one of the plurality of communication terminals, to the second communication terminal, receiving a print completion notification of the uploaded data from the second communication terminal, and displaying, when the print completion notification is received, a message to the effect that the second user has completed printing of the uploaded data, on a screen of the video conference of a communication terminal, out of the plurality of communication terminals, which is used by a notification destination user, set in advance, out of participants of the video conference.

According to the present invention, a presenter of a video conference can confirm whether or not each participant has printed data uploaded for presentation without inquiring the participant.

Further features of the present invention will become apparent from the following description of exemplary embodiments (with reference to the attached drawings).

BRIEF DESCRIPTION OF THE DRAWINGS

FIG. 7A is a diagram showing an example of a sequence for notifying a presenter of a video conference that a file attached to a chat room by the presenter has been printed by a participant.

FIG. 11 is a diagram showing an example of a video conference information table stored in an HDD appearing in FIG. 4.

FIG. 12 is a diagram showing an example of a chat room information table stored in an HDD appearing in FIG. 5.

FIG. 13 is a diagram showing an example of a chat group information table stored in the HDD appearing in FIG. 5.

DESCRIPTION OF THE EMBODIMENTS

The present invention will now be described in detail below with reference to the accompanying drawings showing embodiments thereof. Note that in the following description of the embodiments, configurations are given by way of example, and the present invention is by no means limited to them.

Figure 1:
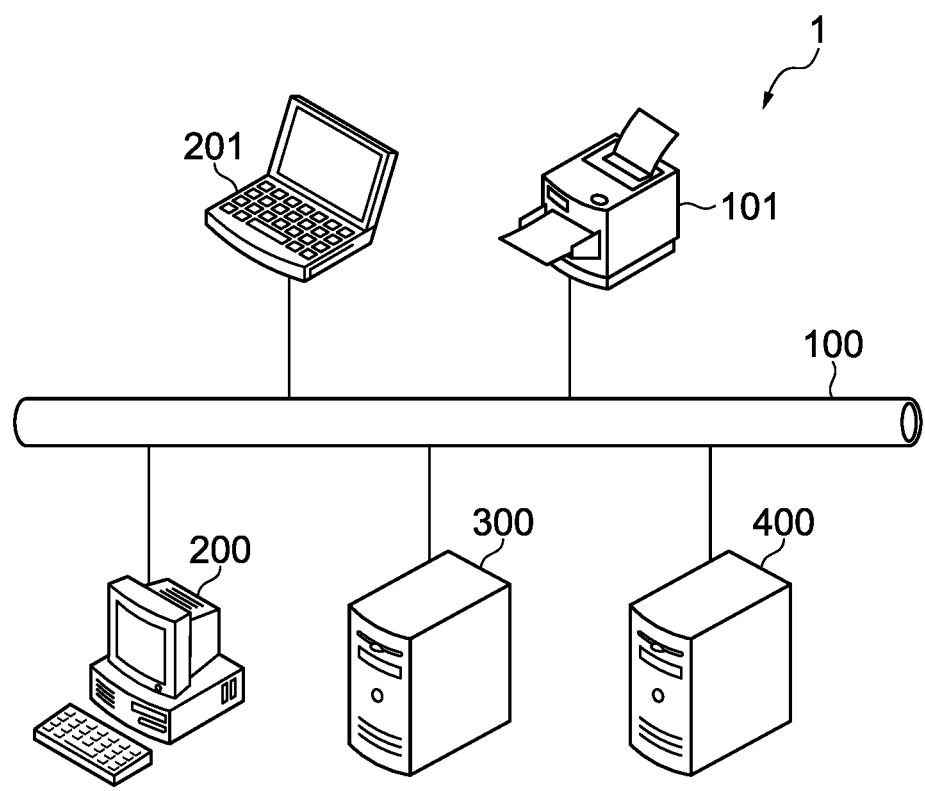
FIG. 1 is a diagram showing an example of the configuration of a video conference system according to an embodiment of the present invention.

FIG. 1 is a diagram showing an example of the configuration of a video conference system 1 according to an embodiment of the present invention.

Referring to FIG. 1, the video conference system 1 includes communication terminals 200 and 201, an MFP 101, a video conference system server 300, and a chart system server 400, and these are interconnected via a network 100. Although in FIG. 1, the two communication terminals, i.e. the communication terminals 200 and 201 are connected to the network 100, it is only required to connect a plurality of communication terminals to the network 100, and the video conference system 1 is not limited to the configuration shown in FIG. 1.

The MFP 101 is an image forming apparatus according to the present embodiment.

The communication terminals 200 and 201 are formed by any of communication terminals, such as personal computers, smartphones, and tablet PCs.

The video conference system server 300 is a server that communicates with the remote communication terminals 200 and 201 and manages a video conference performed using the communication terminals 200 and 201. Here, the video conference refers not to a place where the communication terminals 200 and 201 are set, but to a virtual place where the communication terminals 200 and 201 are connected to each other and a conference is performed.

The chat system server 400 is a server that receives messages, document data, and the like, which are transmitted from the communication terminals 200 and 201, and manages a chat service displayed on the communication terminals 200 and 201. Note that the video conference system server 300 and the chat system server 400 may be configured as a single server.

Note that the communication terminals 200 and 201 have the same functions and hardware configuration, and hence the following description will be given only of the functions and the hardware configuration of the communication terminal 200, and redundant description of the communication terminal 201 is omitted.

The network 100 is the Internet in the present embodiment but is not limited to this. For example, the network 100 may be a LAN (Local Area Network). Further, the network 100 may be a wired network or a wireless network.

Figure 2:
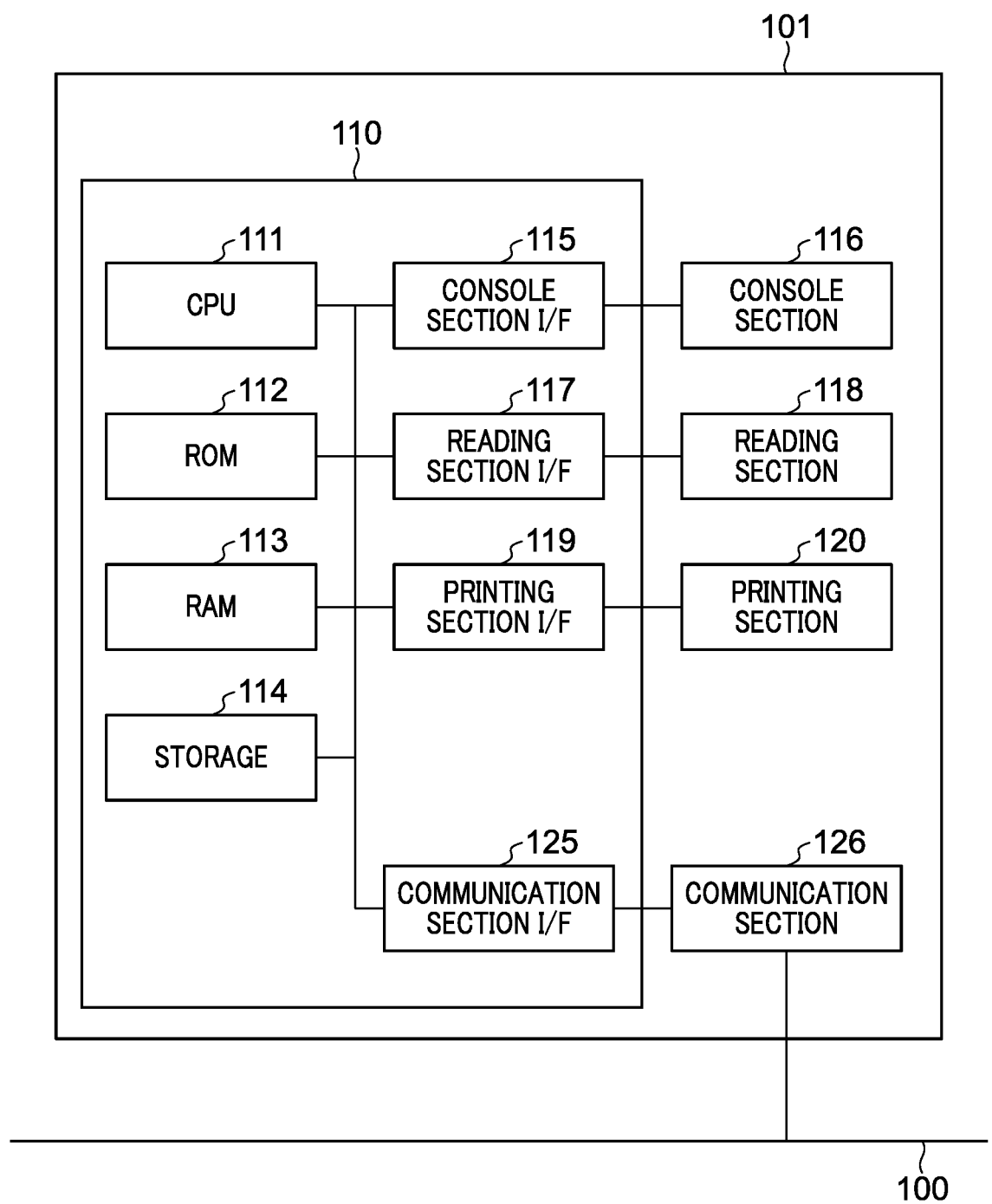
FIG. 2 is a diagram showing an example of the hardware configuration of an MFP appearing in FIG. 1.

FIG. 2 is a diagram showing an example of the hardware configuration of the MFP 101.

Referring to FIG. 2, the MFP 101 includes a controller 110, a console section 116, a reading section 118, a printing section 120, and a communication section 126.

Further, the controller 110 includes a CPU 111, a ROM 112, a RAM 113, a storage 114, a console section interface 115, a reading section interface 117, a printing section interface 119, and a communication section interface 125.

The controller 110 controls the overall operation of the MFP 101.

The CPU 111 loads control programs stored in the ROM 112 or the storage 114 into the RAM 113 to perform a variety of controls, such as reading control and print control.

The ROM 112 stores the control programs which can be executed by the CPU 111. Further, the ROM 112 stores a boot program, font data, and so forth.

The RAM 113 is a main storage memory and is used as a work area and a temporary storage area for loading a variety of control programs stored in the ROM 112 and the storage 114.

The storage 114 stores image data, print data, a variety of programs, and a variety of settings information. Although in the present embodiment, a flash memory is assumed as the storage 114, an auxiliary storage device, such as a solid state drive (SSD) or a hard disc drive (HDD), may be used. Further, an embedded Multi Media Card (eMMC) may be used as the storage 114.

Note that the MFP 101 of the present embodiment is configured such that the one CPU 111 executes processes, of which respective sequences are described hereinafter, using one memory (the RAM 113), but this is not limitative. For example, the processes shown in figures can be executed by causing a plurality of CPUs, RAMs, ROMs, and storages, to cooperate with each other. Further, part of the processes may be executed by using a hardware circuit, such as an ASIC or FPGA.

The console section interface 115 connects between the console section 116 including a display section, such as a touch panel, and hard keys, and the controller 110. The console section 116 displays information to a user and detects an input from a user.

The reading section interface 117 connects between the reading section 118, such as a scanner, and the controller 110. The reading section 118 reads an image of an original, and the CPU 111 converts the read image to image data, such as binary data. The image data generated based on the image read by the reading section 118 is transmitted to an external apparatus or printed on a recording sheet.

The printing section interface 119 connects between the printing section 120, such as a printer, and the controller 110. The CPU 111 transfers image data (print data) stored in the RAM 113 to the printing section 120 via the printing section interface 119. The printing section 120 prints an image based on the transferred image data on a recording sheet fed from a sheet feed cassette.

The communication section interface 125 connects between the controller 110 and the communication section 126. The CPU 111 controls the communication section 126 to transmit image data and a variety of information in the apparatus to an external apparatus on the network 100 and receive print data from a communication terminal on the network 100, via the communication section interface 125. As a method of transmission/reception via the network 100, it is possible to perform transmission/reception using an e-mail or a file transmission using other protocols (such as FTP, SMB, or WEBDAV). Further, image data and a variety of settings data can be transmitted/received via the network 100 by access from the communication terminal 200 using HTTP communication.

Figure 3:
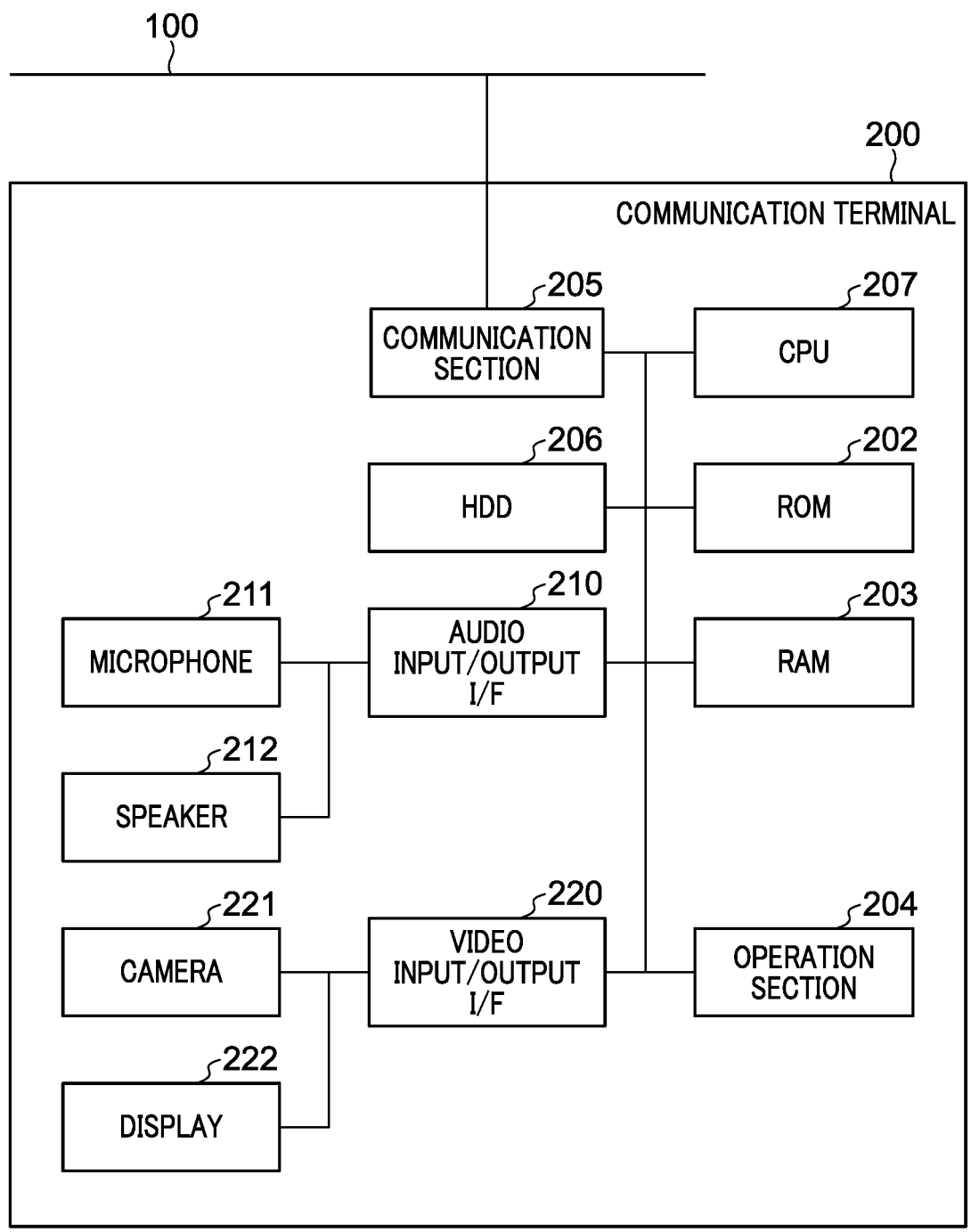
FIG. 3 is a diagram showing an example of the hardware configuration of a communication terminal appearing in FIG. 1.

FIG. 3 is a diagram showing an example of the hardware configuration of the communication terminal 200.

Referring to FIG. 3, the communication terminal 200 include a ROM 202, a RAM 203, an operation section 204, a communication section 205, an HDD 206, a CPU 207, an audio input/output interface 210, and a video input/output interface 220. Further, the audio input/output interface 210 is connected to a microphone 211 and a speaker 212 which are incorporated in the communication terminal 200, and the video input/output interface 220 is connected to a camera 221 and a display 222 which are incorporated in the communication terminal 200.

The CPU 207 reads out control programs stored in the ROM 202 to execute a variety of processes for controlling the operation of the communication terminal 200.

The ROM 202 stores the control programs.

The RAM 203 is used as a main memory and a temporary storage area, such as a work area, for the CPU 207.

The communication section 205 transmits voice, video, and a variety of information to an external apparatus on the network 100, and receives voice, video, and a variety of information from an external apparatus on the network 100. Note that the communication section 205 may perform wired communication using Ethernet (registered trademark) or perform wireless communication, such as Wi-Fi.

The HDD 206 stores a variety of data, such as pictures and electronic documents.

The operation section 204 is comprised of a mouse, a keyboard, a touch panel, and so forth, and a user can input a desired instruction to the communication terminal 200 by operating the operation section 204.

The audio input/output interface 210 performs processing for encoding voice recorded using the microphone 211 and decoding encoded voice information to output voice from the speaker 212. Although the microphone 211 and the speaker 212 are incorporated in the communication terminal 200 in the present embodiment as shown in FIG. 3, this is not limitative. For example, the microphone 211 and the speaker 212 may be arranged outside the communication terminal 200 and be connected via USB terminals, not shown, included in the communication terminal 200.

The video input/output interface 220 performs processing for encoding an image (a still image or a moving image) photographed using the camera 221 and decoding encoded image information to display an image on the display 222. Although, in the present embodiment, the camera 221 and the display 222 are incorporated in the communication terminal 200 as shown in FIG. 3, this is not limitative. For example, the camera 221 may be arranged outside the communication terminal 200 and be connected via a USB terminal, not shown, included in the communication terminal 200. Similarly, the display 222 may be arranged outside the communication terminal 200 and be connected via an HDMI (registered trademark) image output terminal or a VGA image output terminal, not shown, included in the communication terminal 200.

Figure 4:
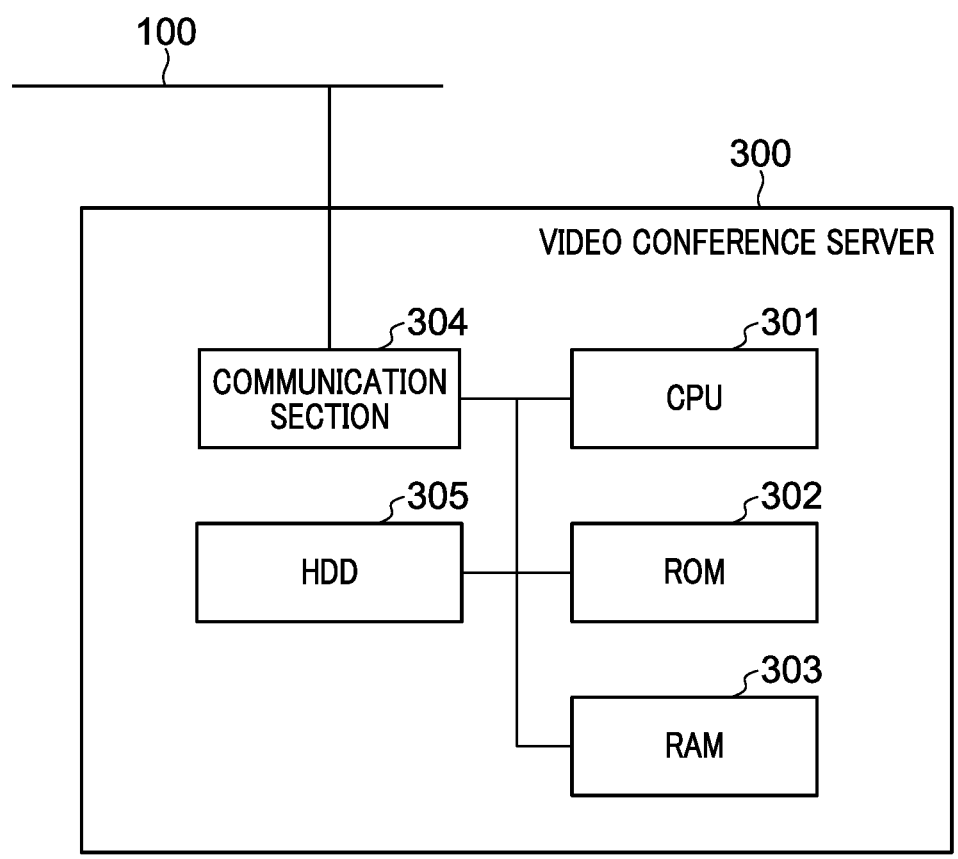
FIG. 4 is a diagram showing an example of the hardware configuration of a video conference system server appearing in FIG. 1.

FIG. 4 is a diagram showing an example of the hardware configuration of the video conference system server 300.

Referring to FIG. 4, the video conference system server 300 includes a CPU 301, a ROM 302, a RAM 303, a communication section 304, and an HDD 305.

The CPU 301 loads control programs stored in the ROM 302 to execute a variety of processes for controlling the operation of the video conference system server 300.

The ROM 302 stores the control programs.

The RAM 303 is used as a main memory and a temporary storage area, such as a work area, for the CPU 301.

The HDD 305 stores various data, such as video, voice, and video conference information.

The communication section 304 is capable of transmitting and receiving data to and from a variety of apparatuses, such as the communication terminal 200 and the chat system server 400, via the network 100. Note that the communication section 304 may perform wired communication using Ethernet or perform wireless communication, such as Wi-Fi.

Figure 5:
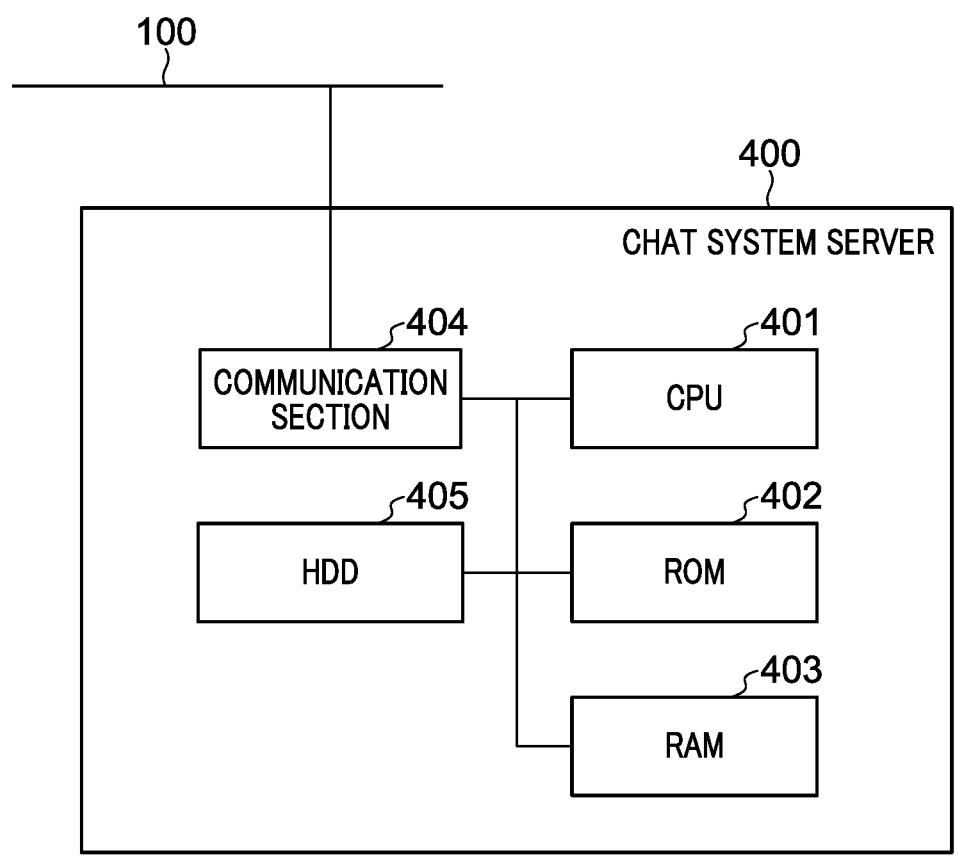
FIG. 5 is a diagram showing an example of the hardware configuration of a chat system server appearing in FIG. 1.

FIG. 5 is a diagram showing an example of the hardware configuration of the chat system server 400.

Referring to FIG. 5, the chat system server 400 includes a CPU 401, a ROM 402, a RAM 403, a communication section 404, and an HDD 405.

The CPU 401 loads control programs stored in the ROM 402 to execute a variety of processes for controlling the operation of the chat system server 400.

The ROM 402 stores the control programs.

The RAM 403 is used as a main memory and a temporary storage area, such as a work area, for the CPU 401.

The HDD 405 stores various data, such as messages, image data, and chat group information.

The communication section 404 is capable of transmitting and receiving data to and from the communication terminal 200 and the video conference system server 300 via the network 100.

Figure 6:
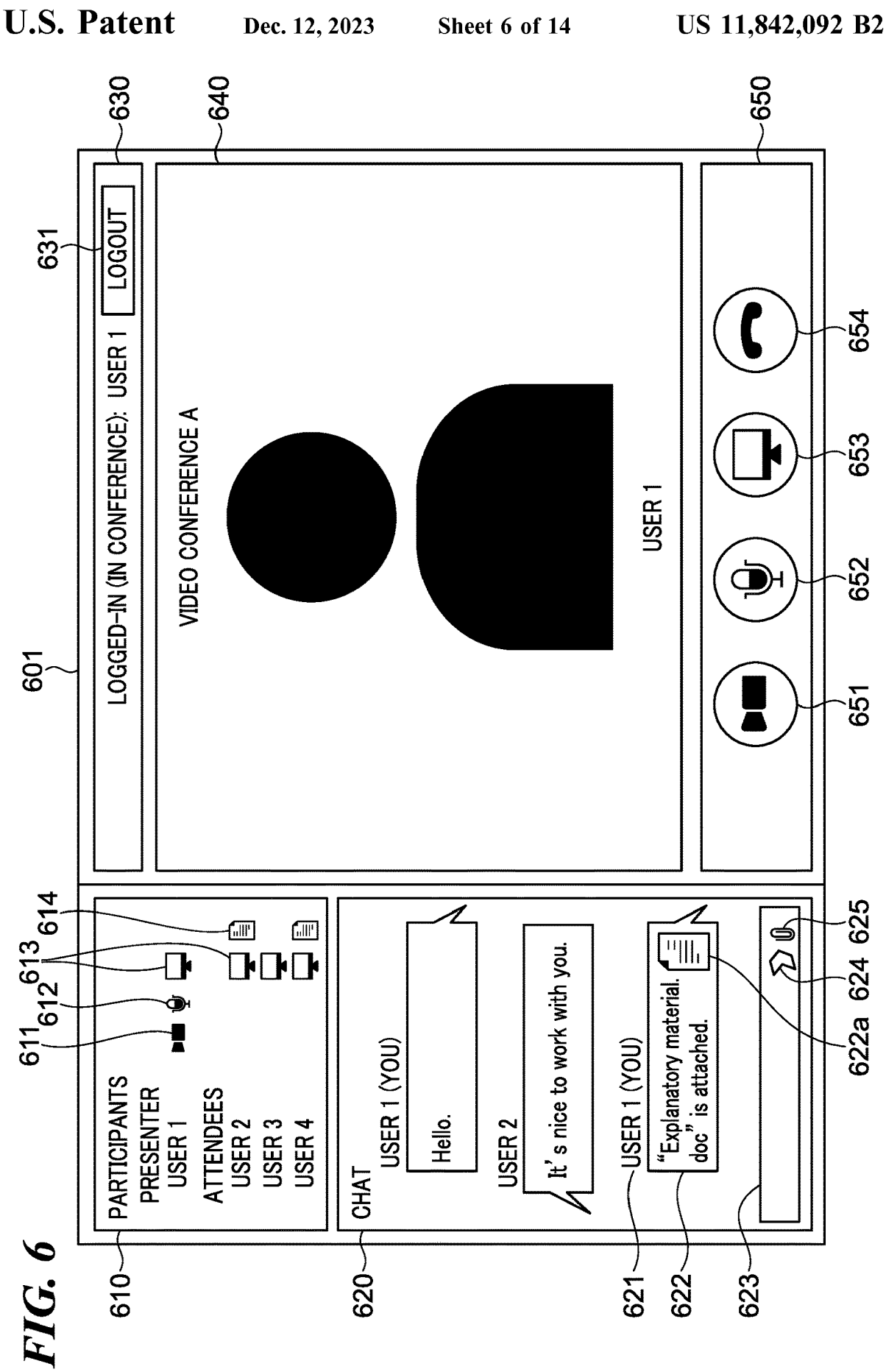
FIG. 6 is a diagram showing an example of a screen of a video conference application, displayed on a display appearing in FIG. 3, in a case where a video conference is being held.

FIG. 6 is a diagram showing a screen 601 as an example of a screen of a video conference application, which is displayed on the display 222 of the communication terminal 200, in a case where a video conference A is being held. Note that the video conference application is installed in each of communication terminals including the communication terminal 200 and the communication terminal 201.

As shown in FIG. 6, the screen 601 of the video conference application of the communication terminal 200 includes a participant display area 610, a chat area 620, a login status area 630, a video display area 640, and a video conference control area 650.

The login status area 630 is an area where a user ID of a user who has logged into the video conference application of the communication terminal 200 is displayed. Further, in the login status area 630, a logout button 631 for logging out of the video conference application is displayed. FIG. 6 shows, by way of example, the login status area 630 indicating that a user whose user ID is "user 1" (hereinafter simply referred to as the user 1: a first user) has logged into the video conference application of the communication terminal 200 (first communication terminal).

The participant display area 610 is an area where users who have logged into the video conference application (hereinafter referred to as the participants) are displayed, and out of the participants, the user 1 as a presenter and users 2 to 4 as attendees are identifiably displayed. The presenter refers to a user who is speaking in the video conference or a user who displays a material video. The attendee refers to a user who is listening to a speech of the presenter and watching a video. The participants may be divided as the presenter and the attendees through automatic recognition by the video conference system 1, or by one of the participants of the video conference.

Further, in the participant display area 610, an icon indicative of a status of each participant is displayed. FIG. 6 shows, by way of example, the participant display area 610 in which icons 611, 612, and 613 indicating the status of the user 1 as the presenter are displayed, and the icon 613 and an icon 614 indicating the status of the user 2 (second user) as one of the attendees are displayed.

The icon 611 indicates that a video photographed by the camera 221 of the communication terminal 200 into which a participant displayed with this icon has logged or a video being displayed on the display 222 of the communication terminal 200 is being distributed to the participants of the video conference A.

The icon 612 indicates that voice input to the microphone 211 of the communication terminal 200 into which a participant displayed with this icon has logged is being distributed to the participants of the video conference A.

The icon 613 indicates that a video currently being distributed to the participants of the video conference A is displayed on the display 222 of the communication terminal 200 into which a participant displayed with this icon has logged.

The icon 614 indicates that a participant displayed with this icon has completed printing of a file attached to the chat area 620.

The chat area 620 is an area where messages posted by participants of the video conference A are displayed, and is provided with a text box 623 for posting a message, a button 625 for attaching a file to the chat area 620, and so forth. Note that the video conference application according to the present embodiment has both of a video conference function and a chat function which are realized as one application, but this is not limitative. For example, the video conference application may have only the video conference function, and an application having the chat function may be realized as an independent application different from the video conference application.

In a case where a participant of the video conference A posts a message to the chat area 620, the participant inputs the message in the text box 623 and then presses a message transmission button 624. When the message transmission button 624 is pressed, the video conference application transmits a combination of the input message and additional information to the chat system server 400. The additional information includes a user ID as a sender, a user ID or a group ID, referred to hereinafter, as a destination, and so forth. Upon receipt of the message, the chat system server 400 stores the message and the additional information in the HDD 405. The video conference application periodically communicates with the chat system server 400 to acquire the user IDs of logged-in users and the messages of which destination is a chat group to which the logged-in users belong. Upon acquisition of the messages from the chat system server 400, the video conference application displays the acquired messages together with the user IDs as the senders, in the chat area 620. In the chat area 620, all acquired messages may be displayed in a time-series order, or only messages transmitted to an individual or one of chat groups may be displayed in a time-series order.

Further, in a case where a file to be printed is shared by all of the participants of the video conference A, a participant of the video conference A (hereinafter referred to as the "sender") presses the button 625 first to attach the file to the chat room. When the button 625 is pressed, a file dialog screen, not shown, for selecting a file to be attached to the chat room is displayed. The sender can select a file from the file dialog screen and determine the selected file as the file to be attached to the chat room. When the file to be attached to the chat room is determined on the file dialog screen, the video conference application transmits the determined file to the chat system server 400 as the attached file together with additional information, including information of the sender and information of the destination. Here, the information of the sender is the user ID of the sender, and the information of the destination is the group ID of the chat group to which all of the participants of the video conference A belong. Upon receipt of the attached file and the additional information, the chat system server 400 stores the attached file and the additional information in the HDD 405. The video conference application periodically communicates with the chat system server 400. With this communication, the video conference application confirms whether or not an attached file associated with sender information indicating the user ID of a user who has logged into the video conference A and destination information indicating the group ID of a chat group to which the user belongs, has been stored in the HDD 405. Further, as a result of the confirmation, if such an attached file has been stored in the HDD 405, the video conference application acquires the attached file together with the additional information. After that, the video conference application displays a message indicating the user ID of the sender and a message indicating the attached file name and attachment of the file, in the chat area 620. In the illustrated example, the user 1 has attached a file "explanatory material. doc" to the chat room. In this case, as shown in FIG. 6, a message 621 indicating "user 1 (you)" and a message 622 indicating "I have attached "explanatory material. doc"" are displayed in the chat area 620. Further, an icon 622a corresponding to an extension of the attached file is displayed in a state attached to the message 622. Although in FIG. 6, the icon 622a is displayed in a state attached to the message 622, if the attached file is image data, the image data itself may be displayed.

Figure 9:
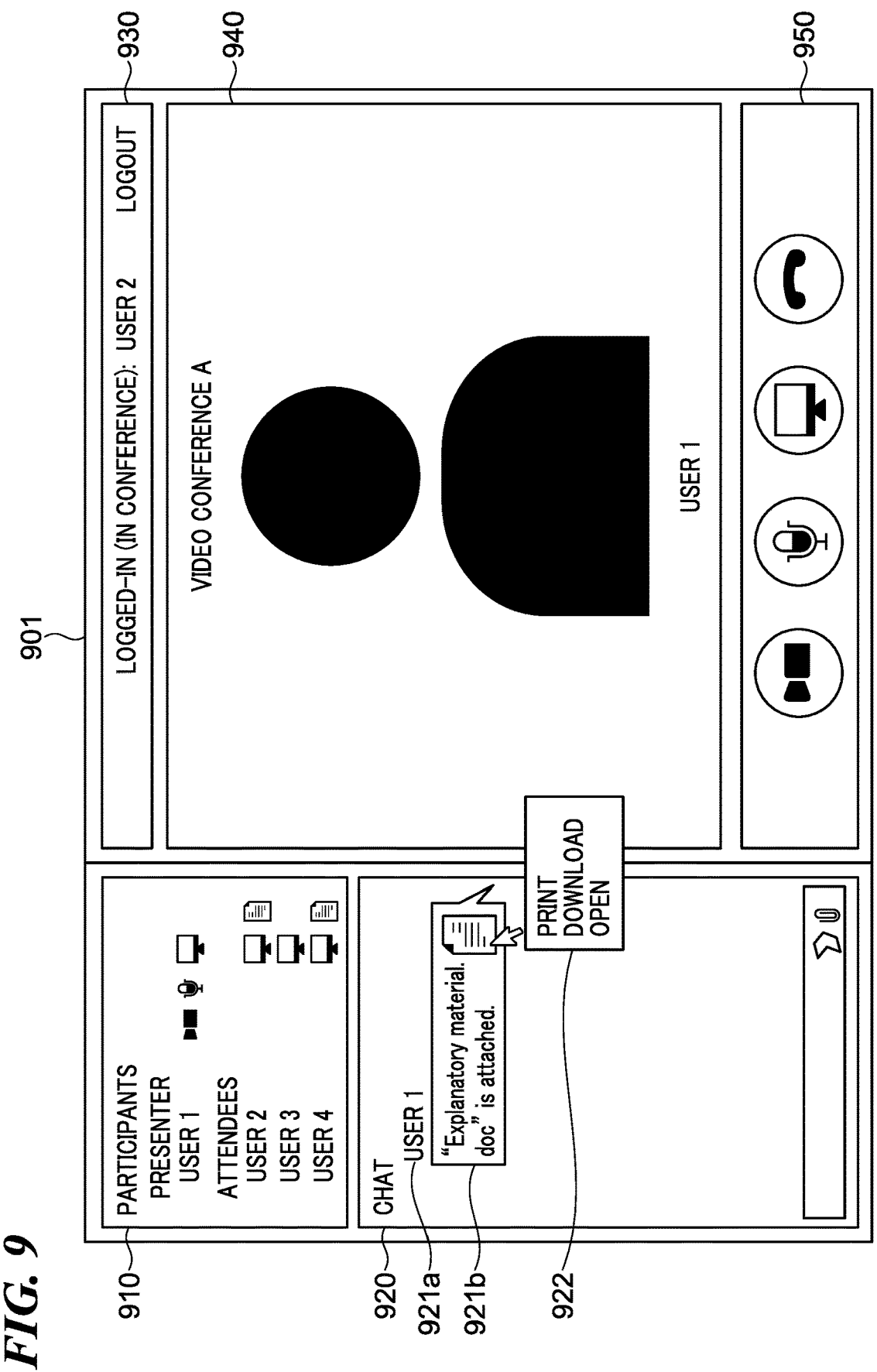
FIG. 9 is a diagram showing an example of a screen for executing printing using the video conference application.

Note that an attendee (user 2 in this example) of the video conference A of the present embodiment is using the communication terminal 201. FIG. 9 shows a screen 900 of the video conference application installed in the communication terminal 201. In FIG. 9, reference numerals 910, 940, and 950 correspond to the reference numerals 610, 640, and 650 in FIG. 6, and hence description thereof is omitted. The user 2 can instruct cooperation of the video conference server 300 and the chat system server 400 on the screen 900. If the file has been attached to the chat room by the user 1 during this cooperation, messages 921a and 921b which are similar to the messages 621 and 622 are also displayed in a chat area 920 of the screen 901 of the video conference application of the communication terminal 201.

When the user 2 right-clicks an icon 921c attached to the message 921b, a popup menu 922 including a "print" button is displayed. When the user 2 selects the "print" button on the popup menu 922, an instruction for printing the attached file is transmitted from the communication terminal 201 to the MFP 101, and the instructed printing operation is executed by the MFP 101. When the printing operation of the attached file is terminated in the MFP 101, the icon 614 indicating completion of printing of the attached file is displayed in the participant display area 610 on the screen 601 of the communication terminal 200 used by the user 1, as described hereinafter with reference to FIG. 7A.

The video display area 640 is an area where a video transmitted from the video conference system server 300 is displayed. Note that in the video display area 640, as shown in FIG. 6, a video conference name ("video conference A" in this example) and a user ID of the video distribution source ("user 1" in this example) may be displayed together.

The video conference control area 650 is an area where buttons for controlling a video conference are displayed and includes buttons 651 to 654.

The button 651 is a button for switching whether or not to perform photographing by the camera 221 and distribute a photographed video in a video conference.

The button 652 is a button for switching whether or not to distribute voice obtained through recording performed by the microphone 211 in a video conference.

The button 653 is a button for switching whether or not to distribute video displayed on the display 222 in a video conference.

The button 654 is a button which enables a user to leave a video conference and disconnect communication, by pressing the button 654.

FIG. 7A is a diagram showing an example of a sequence for notifying the user 1 that a file attached to the chat room by the user 1 as the presenter of the video conference A has been printed by the user 2 as an attendee (participant) of the video conference A. Note that in the sequence shown in FIG. 7A, the user 1 uses the communication terminal 200 and the user 2 uses the communication terminal 201.

First, in a step S701, the user 1 double-clicks an icon for starting the video conference application, displayed on the display 222 of the communication terminal 200, to start the video conference A. With this, the video conference application started on the communication terminal 200 displays a login information input screen for logging into the video conference system on the display 222 of the communication terminal 200. Then, when login information is input to the displayed input screen by the user 1, the video conference application of the communication terminal 200 transmits the input login information and a login authentication request from the communication terminal 200 to the video conference system server 300.

In a step S702, if the login authentication based on the login information transmitted from the communication terminal 200 is successful, the video conference system server 300 transmits the login information transmitted in the step S701 and a login authentication request to the chat system server 400. If the login authentication based on the login information transmitted from the video conference system server 300 is successful, the chat system server 400 notifies the video conference system server 300 of this fact. Upon receipt of this notification from the chat system server 400, the video conference system server 300 transmits a notification that the login authentication in each of the video conference system server 300 and the chat system server 400 is successful to the communication terminal 200. When this notification is sent from the video conference system server 300 to the communication terminal 200, the video conference application of the communication terminal 200 displays a notification screen notifying that login to the video conference system is successful, on the display 222 of the communication terminal 200. This notification screen includes a setting button for setting a new video conference and a video conference start button.

Next, in a step S703, when the user 1 presses the setting button of the notification screen displayed in the step S702, the video conference application of the communication terminal 200 displays a video conference configuration screen 800 (see FIG. 8) on the display 222 of the communication terminal 200. On the video conference configuration screen 800, the user 1 can configure video conference settings including a print notification destination setting which indicates a notification destination to which a notification is sent in a case where a participant of the video conference prints a file attached to the chat room. Upon completion of the video conference configuration performed on the video conference configuration screen 800, the video conference application transmits the set video conference settings from the communication terminal 200 to the video conference system server 300.

Figure 7B:
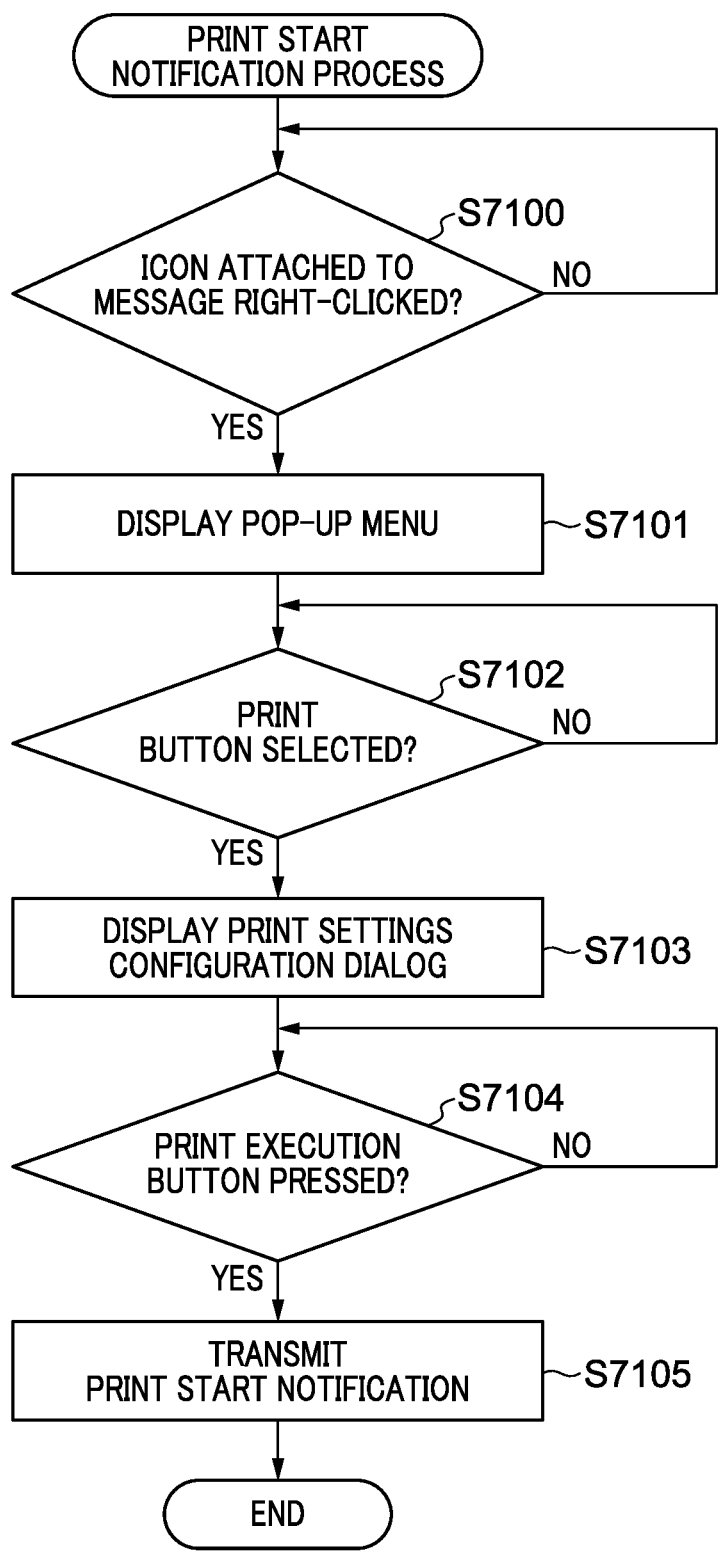
FIG. 7B is a flowchart of a print start notification process in a step in FIG. 7A.
Figure 8:
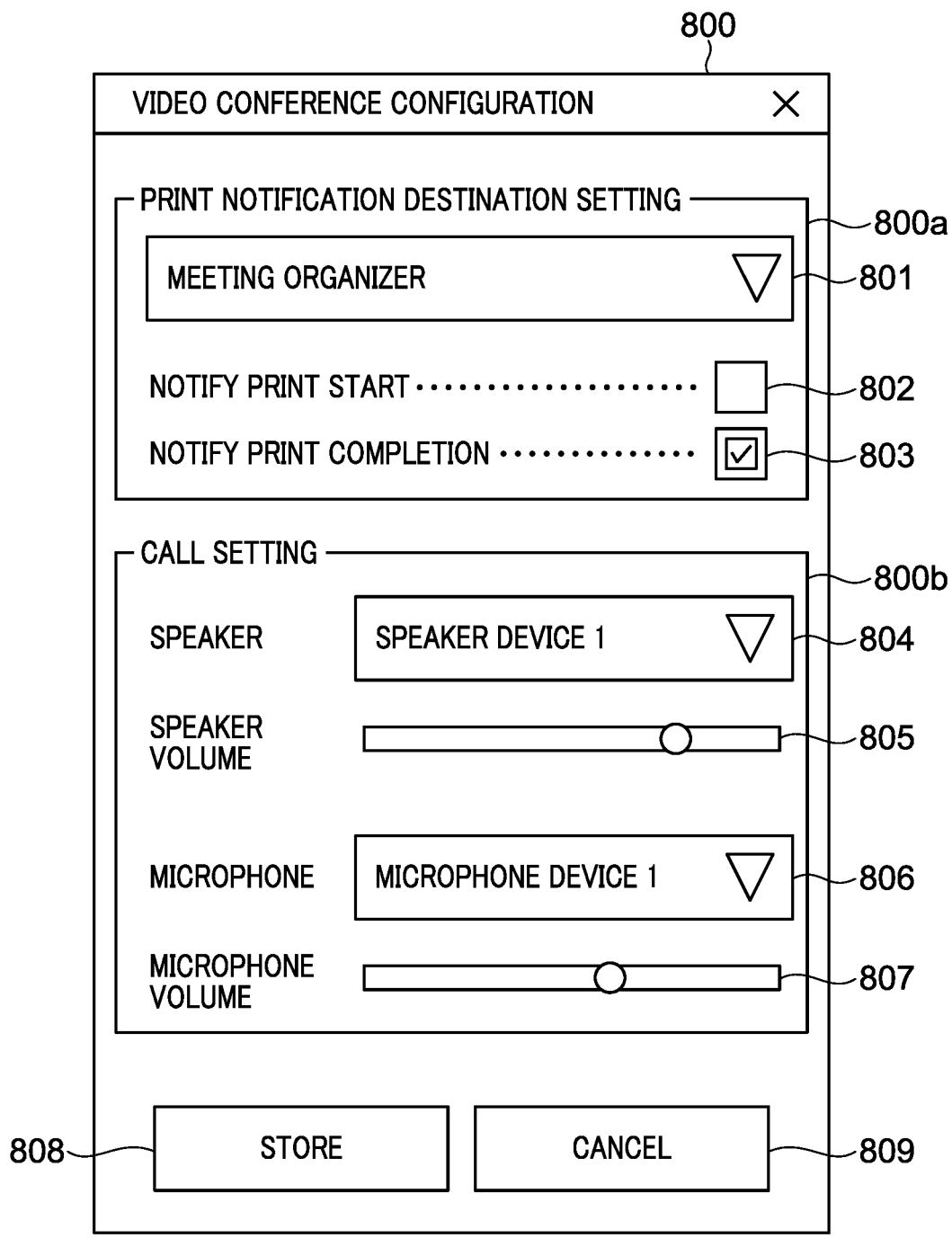
FIG. 8 is a diagram showing an example of a video conference configuration screen used to set a print notification destination, etc., transmitted in a step in FIG. 7A.

FIG. 8 is a diagram showing the video conference configuration screen 800 as an example of the video conference configuration screen used to configure the video conference settings including the print notification destination setting, which are transmitted in the step S703 in FIG. 7A.

The video conference configuration screen 800 is formed by a print notification destination-setting section 800a in which the print notification destination setting is configured, a call setting section 800b in which call settings are configured, a storage button 808, and a cancel button 809.

The print notification destination-setting section 800a includes a list box 801 and checkboxes 802 and 803.

The list box 801 is for selecting one of "group owner", "presenter", "meeting organizer", and "none", for example, as a print notification destination.

The checkbox 802 is for selecting whether or not to notify the start of printing of a file attached to the chat room to the print notification destination. More specifically, in a case where the checkbox 802 is checked, when a participant of the video conference A starts printing of a file attached to the chat room, a message indicating the start of printing of the file is transmitted to a user as the print notification destination. On the other hand, in a case where the checkbox 802 is not checked, the above-mentioned message is not transmitted.

The checkbox 803 is for selecting whether or not to notify the completion of printing of the file attached to the chat room to the print notification destination. More specifically, in a case where the checkbox 803 is checked, when a participant of the video conference A completes printing of a file attached to the chat room, a message indicating the completion of printing of the file is transmitted to a user as the print notification destination. On the other hand, in a case where the checkbox 803 is not checked, the above-mentioned message is not transmitted.

The call setting section 800b includes list boxes 804 and 806 and volume setting bars 805 and 807.

The list boxes 804 and 806 are for selecting devices used in the video conference A, such as the speaker 212 and the microphone 211, respectively.

The volume setting bars 805 and 807 are for setting volumes of devices selected in the list boxes 804 and 806, respectively, by sliding the bar.

The storage button 808 is a button for causing, when pressed, the video conference application to transmit the information of the video conference settings configured on the video conference configuration screen 800 from the communication terminal 200 to the video conference system serve 300. The video conference system server 300 stores the information of the video conference settings including the print notification setting, which is transmitted from the communication terminal 200, in the HDD 305 in a state associated with the user ID (user 1) of the user having logged into the communication terminal 200.

The cancel button 809 is a button for causing, when pressed, the video conference application to discard the changed video conference settings information.

When the storage button 808 or the cancel button 809 is pressed, the video conference application returns the video conference configuration screen 800 shown in FIG. 8 to the notification screen displayed in the step S702.

Note that in a case where the default setting of the print notification destination setting is a setting desired by the user 1, the step S703 is skipped, and the process directly proceeds from the step S702 to a step S704, described hereinafter.

Referring again to FIG. 7A, in the step S704, when the user 1 presses the video conference start button of the notification screen, a configuration screen for configuring the details of the video conference to be started is displayed. The user 1 can set a name of the video conference to be started ("video conference A" in this example) and request to start the set video conference. When a request for starting the video conference A is received from the user 1 on the configuration screen, the video conference application of the communication terminal 200 transmits a request for starting the video conference A from the communication terminal 200 to the video conference system server 300.

When the request for starting the video conference A is received from the communication terminal 200, the video conference system server 300 starts the video conference A according to the video conference settings stored in association with the user 1 logged into the communication terminal 200. After that, the video conference system server 300 transmits a notification that the video conference A has been started to the communication terminal 200.

Upon receipt of the notification that the video conference A has been started, which is transmitted from the video conference system server 300 to the communication terminal 200, the video conference application of the communication terminal 200 displays the screen 601, shown in FIG. 6, on the display 222 of the communication terminal 200. In the login status area 630 of the screen 601, "logged-in (in conference)" is displayed as the login status and "user 1" as the user ID of the logged-in user is displayed.

Note that the configuration screen displayed in the step S704 is provided with a list box for designating users to be called to participate in the video conference A (participants of the video conference A). This list box may be configured such that participants of the video conference A can be designated on a user basis, and such that by selecting a group ID of a chat group to which the user 1 belongs, all users belonging to the chat group can be designated.

Further, upon receipt of a conference start request for the video conference A, the video conference system server 300 records information on the video conference A in a video conference information table 1100, shown in FIG. 11, which is stored in the HDD 305.

Here, the video conference information table 1100 shown in FIG. 11 will be described.

The video conference information table 1100 stores information on a video conference being held, more specifically, a video conference ID uniquely indicative of the video conference, persons participating in the video conference, a group ID, a print notification destination setting, and a user as a print notification destination (print notification destination user), in the associated state.

In the column of the group ID, in a case where a chat group is designated as the participants of the video conference, the group ID of the chat group is recorded. For example, in a case where a group A as a chat group is designated as the participants at the start of a video conference, the group A is recorded in the column of the group ID.

In the column of the print notification destination setting, the print notification destination setting recorded in the video conference settings information of a user who has requested to start the video conference at the start of the video conference is recorded.

Further, when the video conference is terminated, the video conference information of the video conference is deleted from the video conference information table 1100.

Referring again to FIG. 7A, in a step S705, when the video conference system server 300 starts the video conference A according to the video conference start request received in the step S704, the video conference system server 300 transmits the information of the print notification destination user to the chat system server 400 according to the print notification destination setting. In the illustrated example in FIG. 8, "meeting organizer" is set as the print notification destination setting. Therefore, the video conference system server 300 transmits a notification that the user 1 who is the meeting organizer of the video conference A is the print notification destination user, to the chat system server 400.

Note that in a case where "group owner" is set as the print notification destination setting, the owner of the chat group, out of the participants of the video conference, becomes the print notification destination user. In a case where none of the participants of the video conference is the owner of the chat group, the print notification destination user is set to "none". Further, in a case where a user who belongs to a plurality of chat groups is designated as a participant of the video conference, the respective owners of the chat groups become the print notification destination users.

Further, in a case where "presenter" is designated as the print notification destination setting, the print notification destination user is a user who is the presenter of the corresponding video conference. Note that in a case where the print notification destination setting of the video conference is set to "presenter", when the video conference system server 300 detects that the presenter changed to a new presenter during the video conference, the video conference system server 300 stores the new presenter as the print notification destination user. Further, in a case where there is no user who is a presenter in the video conference, the print notification destination user is set to "none".

Note that the video conference system server 300 can send a call notification to each participant of the video conference A in parallel with the step S705. The method of this call notification is not particularly limited, but for example, the call notification is performed by transmitting a call notification e-mail to an e-mail address of each participant.

Referring again to FIG. 7A, in a step S706, upon receipt of this call notification, the user 2 double-clicks a video conference application start icon displayed on the display 222 of the communication terminal 201 to participate in the video conference A. With this, the video conference application started on the communication terminal 201 displays a login information input screen for logging into the video conference system on the display 222 of the communication terminal 201. After that, when login information is input by the user 2 on the displayed input screen, the video conference application of the communication terminal 201 transmits the input login information and a login authentication request from the communication terminal 201 to the video conference system server 300.

In a step S707, if the login authentication based on the login information transmitted from the communication terminal 201 is successful, the video conference system server 300 transmits the login information transmitted in the step S706 and a login authentication request to the chat system server 400. If the login authentication based on the login information transmitted from the video conference system server 300 is successful, the chat system server 400 notifies the video conference system server 300 of this fact. Upon receipt of this notification from the chat system server 400, the video conference system server 300 transmits a notification that the login authentication in each of the video conference system server 300 and the chat system server 400 is successful to the communication terminal 201. When this notification is sent from the video conference system server 300 to the communication terminal 201, the video conference application of the communication terminal 201 displays a notification screen that login to the video conference system is successful, on the display 222 of the communication terminal 201. This notification screen includes a list of the video conferences in which the user 2 is currently allowed to participate and a video conference start button.

Next, in a step S708, the user 2 designates a video conference in which the user 2 is going to participate (video conference A in this example) from the list on the notification screen displayed in the step S707 and then presses the video conference start button. When pressing of the video conference start button is detected, the video conference application of the communication terminal 201 transmits a video conference participation request (request for participating the video conference A in this example) to the video conference system server 300. Although in the present embodiment, the user 2 participates in the video conference A according to reception of a call from the user 1 as the meeting organizer of the video conference, the method of participating in a video conference is not limited to this. For example, a user may participate by accessing a URL issued for each video conference. Upon receipt of this video conference participation request, the video conference system server 300 adds the user 2 to the participants of the video conference A on the video conference information table 1100. Then, the video conference system server 300 transmits a notification that the user 2 is allowed to participate in the video conference A to the communication terminal 201.

When the notification that the user 2 is allowed to participate in the video conference A is transmitted from the video conference system server 300 to the communication terminal 201, the video conference application of the communication terminal 201 displays the screen 901 on the display 222 of the communication terminal 201. The screen 901 displays "logged-in (in conference)" as the login status and "user 2" as the user ID of the logged-in user in a login status area 930.

Here, the video conference system and the chat system used in the present embodiment will be described.

A user participating in a video conference can use not only the video conference through video and voice, but also transmission/reception of a message through chatting, and uploading/downloading of an attached file, by using the video conference application.

The video conference system server 300 receives videos and audios from all of the communication terminals 200 and 201 participating in one video conference (the video conference A in this example), and synthesizes the received videos and audios into one screen and one audio. After that, the video conference system server 300 returns the synthesized one screen and one audio to all of the communication terminals 200 and 201 participating in the video conference A. With this, the users 1 and 2 who are using the communication terminals 200 and 201, respectively, can remotely perform the conference through videos and audios.

The chat system server 400 provides a chat room where messages can be exchanged between individuals or within a group and files can be submitted. Further, in the chat room, not only messages can be exchanged, but also files can be attached. Each attached file is stored in the HDD 405 of the chat system server 400 and is transmitted to the communication terminal 200 via the network 100 according to a downloading instruction from the communication terminal 200. The chat room is opened according to an opening request from a user or the video conference system server 300. Further, in a case where a user makes an opening request to open a specific chat room, the user who is a founder of the chat room can invite other users to the chat room and allow the users to participate. Alternatively, any user who is participating in the chat room can invite another user who is not participating in the chat room and allow the invited user to participate anew. The chat rooms can exist in plurality corresponding to the number of opened chat rooms. Further, in a case where a chat group has been created in advance, a chat room can be opened when a member belonging to a designated chat group participates in the chat room.

When a chat room is opened, chat room information is recorded in a chat room information table 1200 (shown in FIG. 12).

FIG. 12 is a diagram showing an example of the chat room information table 1200 stored in the HDD 405 appearing in FIG. 5.

The chat room information table 1200 stores information on each of opened chat rooms, more specifically, a room ID uniquely indicative of each opened chat room, a group ID, participants of the chat room, and so forth, in the associated state.

In a case where a chat room is opened anew, user IDs participating in the chat room are additionally recorded in the chat room information table 1200 in association with a room ID which is uniquely determined. Further, in a case where, as a chat room dedicated to one chat group, a chat room is opened with all users belonging to the one chat group as participants, the group ID is recorded in association with the room ID.

In the example shown in FIG. 12, two chat rooms of which the room IDs are room A and room B are opened. The user 1, the user 2, a user 3, and a user 4 participate in the room A. Further, the chat room information table 1200 shows that the room A is a chat room of the group A, which is opened to allow a chat to be performed between members belonging to the group A.

FIG. 13 is a diagram showing an example of a chat group information table 1300 storing information on chat groups, which is stored in the HDD 405 appearing in FIG. 5.

In the chat group information table 1300, group IDs, group owners as representatives of respective chat groups, and user IDs belonging to each chat group are registered.

A chat group can be created on a chat group creation screen, not shown, displayed on the communication terminal 200. Further, on this screen, a user to be set as a group member can be selected, and chat group information including a chat group name and a group owner can be set and registered. The registered chat group information is additionally stored in the chat group information table 1300. The group owner has the power to change the settings of a chat group to which the owner belongs, such as to add or delete a group member and to delete the chat group itself. In a case where the chat group is deleted by the group owner, the information of the chat group is deleted from the chat group information table 1300. A user can belong to a plurality of chat groups, and for example, as shown in FIG. 13, the user 1 belongs to the groups A and C, and further, the user 1 is the group owner of both the groups. The user 1 can transmit a message to the chat groups of the groups A and C, and for example, in a case where the user 1 posts a message to the chat group of the group A, the message is transmitted to the user 2, the user 3, and the user 4.

In the present embodiment, the video conference system server 300 performs opening of a chat room where participants of a video conference can exchange messages, on a video conference basis. For example, in the video conference A, a chat room in which the user 1, the user 2, the user 3, and the user 4 participate is opened by the video conference system server 300.

Referring again to FIG. 7A, in a step S709, the user 1 attaches a file named "explanatory material. doc" in the chat room being held in the video conference A, for sharing materials. The file attached to the chat room being held is transmitted (uploaded) to the chat system server 400 by the video conference application of the communication terminal 200.

In a step S710, when the attached file is uploaded, the chat system server 400 posts a message indicating the user ID of the user who has attached this file and a message that the file has been attached. Upon receipt of this posting, the video conference application of the communication terminal 200 displays the messages 621 and 622 in the chat area 620 on the screen 601 of the communication terminal 200 and the video conference application of the communication terminal 201 displays the messages 921*a* and 921*b* in the chat area 920 on the screen 901 of the communication terminal 201. With this, the user 2 as the participant of the video conference A can know that the file has been attached to the chat room by the user 1.

Next, in a step S711, the video conference application of the communication terminal 201 executes a print start notification process.

FIG. 7B is a flowchart of the print start notification process in the step S711 in FIG. 7A.

First, in a step S7100, if it is detected that the user 2 has selected a file attached to the chat room by right-clicking the icon 921*c* attached to the message 921*b* in the chat area 920, the process proceeds to a step S7101.

In the step S7101, the pop-up menu 922 is displayed by an add-on application. The pop-up menu 922 may be displayed by another operation performed by the user 2. For example, the pop-up menu 922 may be displayed when the icon 921*c* displayed on the touch panel of the operation section 204 is long-pressed.

In a step S7102, if it is detected that the user 2 has selected the "print" button on the pop-up menu 922, the process proceeds to a step S7103.

In the step S7103, a print settings configuration dialog is displayed. Note that in a case where the icon 921*c* is right-clicked in the step S7100, the steps S7101 and S7102 may be skipped, whereby the process may proceed directly to the step S7103 to display the print settings configuration dialog.

In a step S7104, if it is detected that after performing configuration of print settings, such as selection of a printer and setting of the number of print copies, the user 2 has pressed a "print start" button, on the print settings configuration dialog, it is judged that the user 2 has issued a print execution instruction, and the process proceeds to a step S7105.

In the step S7105, a print start notification including the information of the attached file selected in the step S7100 and the user ID of the user 2 having issued the print execution instruction in the step S7104 is transmitted from the communication terminal 201 to the chat system server 400, followed by terminating the present process.

Figure 10:
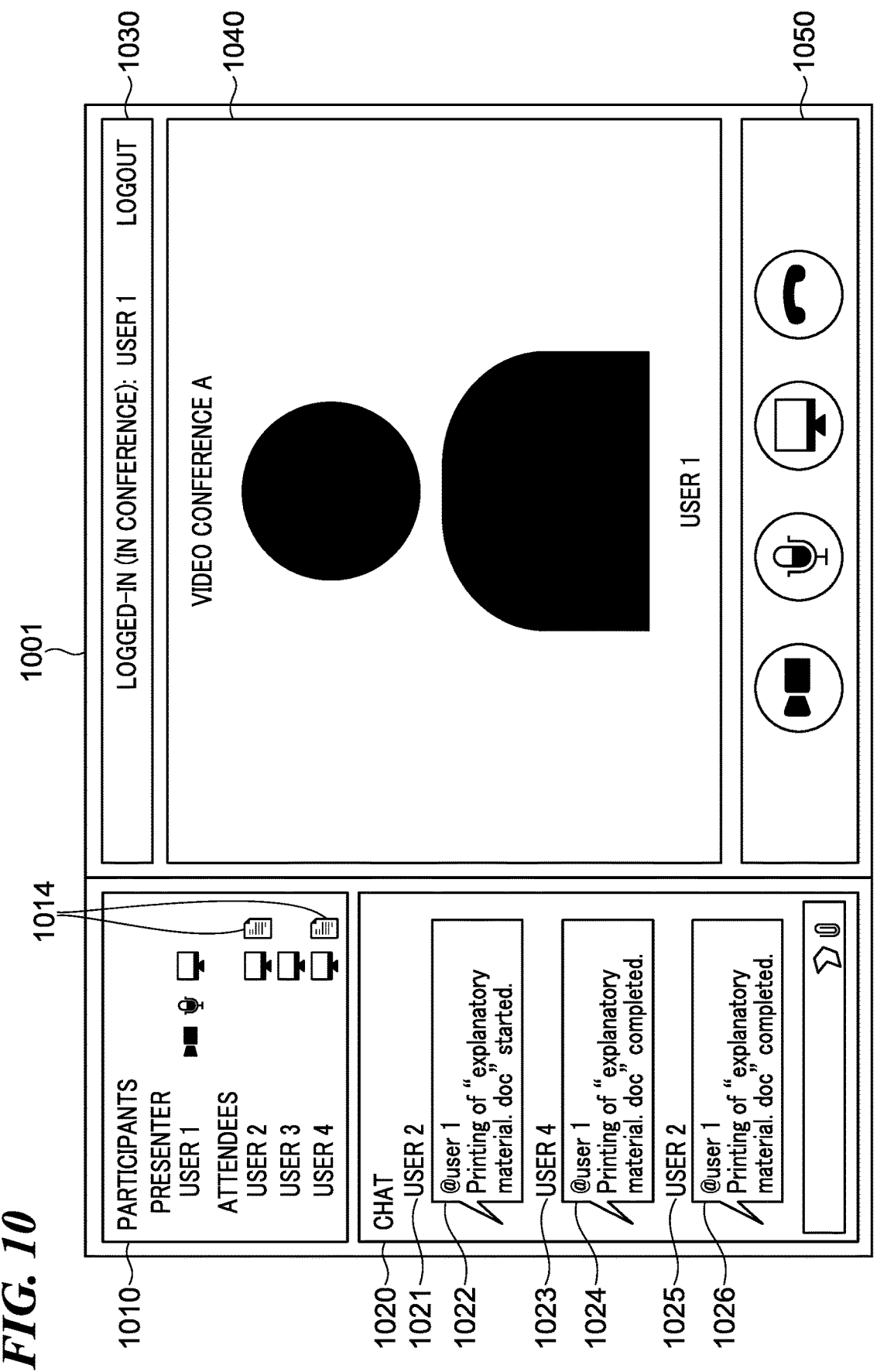
FIG. 10 is a diagram showing an example of a screen for displaying a print completion notification by the video conference application.

Referring again to FIG. 7A, in a step S712, when the chat system server 400 receives the print start notification transmitted from the communication terminal 201 in the step S711, the chat system server 400 posts the print start notification to the chat room of the video conference A by designating a destination (mention designation). Here, the mention refers to a character string formed by adding "@" to the beginning of the user ID of the print notification destination, such as "@user 1" appearing in a message 1024 in FIG. 10 which is a diagram showing a screen 1001 for displaying a print completion notification by the video conference application e.g. of the communication terminal 200. Note that in FIG. 10, reference numerals 1030, 1040, and 1050 correspond to the reference numerals 630, 640, and 650 in FIG. 6, and hence description thereof is omitted. According to this posting, the video conference application of the communication terminal 200 displays the screen 1001 on the communication terminal 200. As shown in FIG. 10, the screen 1001 displays a message 1021 showing that the notification is sent from the "user 2" and a message 1022, including the mention @user 1, that printing of "explanatory material. doc" has been started, in a chat area 1020 thereof. With this, the user 1 as the print notification destination can know that the user 2 has started printing of the attached file by confirming the chat area 1020 on the screen 1001.

Note that the method of posting the print start notification to the chat room in the step S712 is not limited to this. For example, the chat system server 400 may post a notification notifying the start of printing to a chat room of an individual as the print notification destination user. Further, the processing for posting the print start notification in the step S712 is not performed in a case where the user 1 has not checked the checkbox 802 on the video conference configuration screen 800 appearing in FIG. 8. Further, in a case where the user 1 has selected "none" as the print notification destination user in the list box 801 appearing in FIG. 8, the processing for posting the print start notification in the step S712 and processing for posting a print completion notification in a step S719, referred to hereinafter, may not be executed. Note that in a case where the user 1 has selected "none" as the print notification destination user in the list box 801 appearing in FIG. 8, in the posting processing in the steps S712 and S719, the notification may be posted to the chat room of the video conference A without mention.

After posting the print start notification in the step S712, in a step S714, the chat system server 400 (data transfer unit) transmits (downloads) the attached file to the communication terminal 201 as a response to the print start notification in the step S711.

In a step S715, when the communication terminal 201 receives the attached file from the chat system server 400, the video conference application of the communication terminal 201 submits a print job for printing the attached file to the MFP 101.

Note that in the present embodiment, as the print job, control commands including a double-sided print setting, a stapling setting, and/or the like are also transmitted to the MFP 101 together with the print data, via a printer driver, not shown, included in the communication terminal 201.

In a step S716, the MFP 101 starts execution of the print job submitted in the step S715.

In a step S717, when the print job having started in the step S716 is completed, the MFP 101 transmits a job completion notification to the communication terminal 201 which submitted the print job to the MFP 101 in the step S715. More specifically, after submitting the print job from the communication terminal 201 to the MFP 101 in the step S715, the video conference application of the communication terminal 201 periodically transmits a query about the print status to the MFP 101. In response to this query, when the print job is completed, the MFP 101 issues the job completion notification.

In a step S718, upon receipt of the job completion notification issued from the MFP 101 in the step S717, the video conference application of the communication terminal 201 transmits a print completion notification to the chat system server 400. The chat system server 400 (print completion notification reception unit) can determine, based on the received print completion notification, that the print job has been completed in the MFP 101. Note that the method used in the steps S717 and S718 is not limitative, but any other suitable method can be employed insofar as the chat system server 400 can perform this determination by the method. For example, the print job submitted in the step S715 may include a command for causing the MFP 101 to voluntarily issue a job completion notification to the communication terminal 201 upon completion of the print job. Further, the chat system server 400 may periodically transmit a request for acquiring a job status to the MFP 101 after transmitting the attached file to the communication terminal 201 in the step S714. In this case, the print completion notification is sent directly from the MFP 101 to the chat system server 400 in response to this acquisition request.

In the step S719, upon receipt of the print completion notification issued from the communication terminal in the step S718, the chat system server 400 (message display unit) posts a print completion notification to the chat room of the video conference A by designating a destination (mention designation). Upon receipt of this posting, the video conference application of the communication terminal 200 displays the screen 1001 on the communication terminal 200. As shown in FIG. 10, in the chat area 1020, a message 1025 indicating that the notification is sent from the "user 2" and a message 1026, including the mention @user 1, that printing of "explanatory material. doc" is completed are displayed. With this, the user 1 as the print notification destination can know that the user 2 has completed printing of the attached file, by confirming the chat area 1020 on the screen 1001.

Note that the method of posting the print completion notification to the chat room in the step S719 is not limited to this. For example, the chat system server 400 may perform posting of the print completion notification by posting a notification indicative of the completion of printing to a chat room of an individual as the print notification destination user. Further, the processing for posting the print completion notification in the step S719 is not performed in a case where the user 1 has not checked the checkbox 803 on the video conference configuration screen 800 shown in FIG. 8.

The chat area 1020 appearing in FIG. 10 shows messages 1023 to 1026 as an example of the print completion notification displayed in a case where the user 4 and the user 2 have completed printing of "explanatory material. doc". Further, in an attendee display area 1010, icons 1014 indicating that the user 4 and the user 2 have completed printing are displayed. The icon 1014 may be hidden when a different file is newly attached or may be hidden after a predetermined time period elapses.

Figure 14:
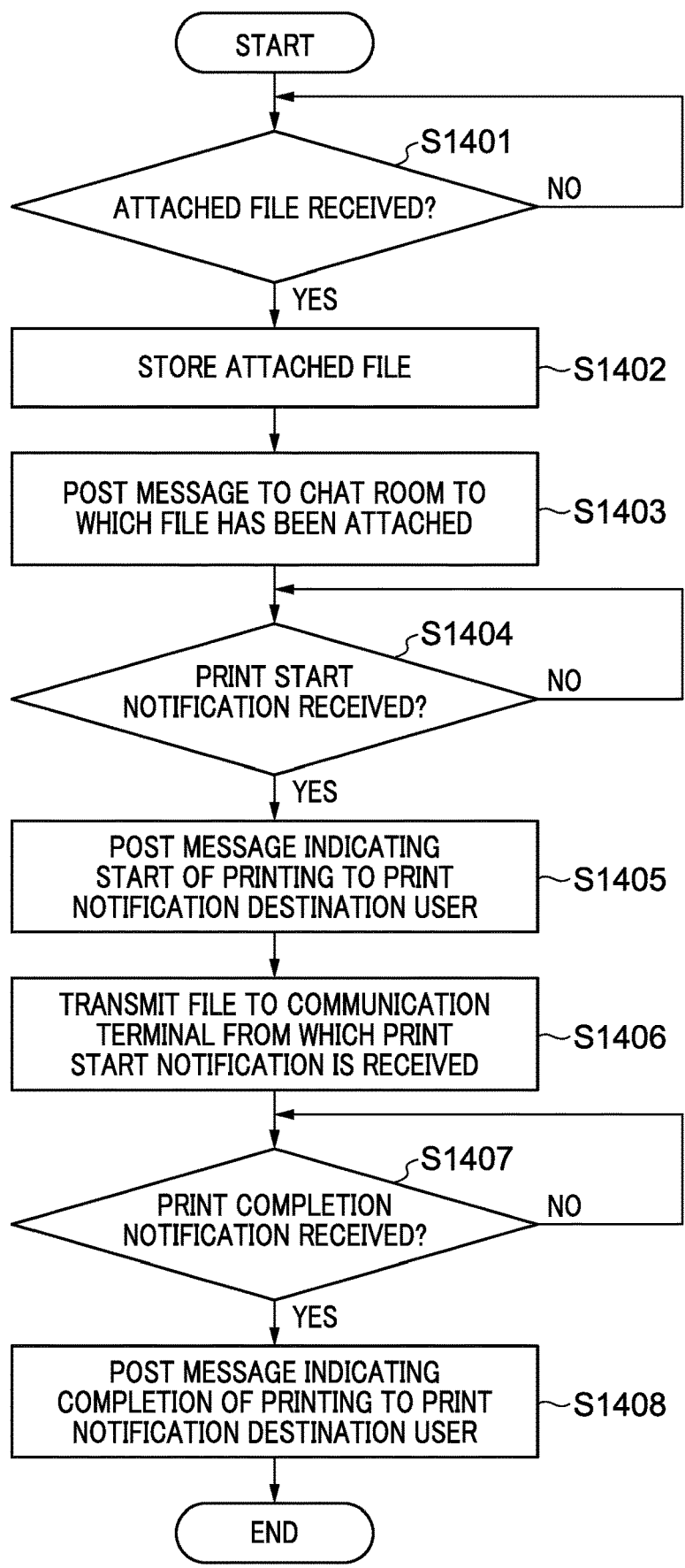
FIG. 14 is a flowchart of a process performed by the chat system server in steps in FIG. 7A.

FIG. 14 is a flowchart of a process performed by the chat system server 400 in the steps S710 to S719 in FIG. 7A.

First, upon receipt of an attached file from the video conference application (YES to a step S1401), the chat system server 400 proceeds to a step S1402.

In the step S1402, the chat system server 400 stores the received attached file in the HDD 405. At this time, data of the received attached file is stored in association with the room ID of the chat room to which this file is attached and the user ID of the user who has attached this file (the user 1 in the example in FIG. 7A).

In a step S1403, the chat system server 400 posts a message that this file has been attached, to the chat room to which attachment of this file has been performed (corresponding to the step S710 in FIG. 7A).

Next, in a step S1404, the chat system server 400 determines whether or not the print start notification transmitted from the communication terminal 201 in the step S711 in FIG. 7A has been received. The print start notification is sent when the user (the user 2 in the example in FIG. 7A) gives an instruction for executing printing of the attached file on the print settings configuration dialog displayed by the video conference application on the display 222 of the communication terminal 201.

Here, the instruction for executing printing of the attached file will be described. As described hereinabove, when printing the attached file, the user 2 selects the icon 921c attached to the message 921b displayed in the chat area 920 and selects the "print" button on the displayed pop-up menu 922. When the "print" button is selected, the video conference application of the communication terminal 201 displays the print settings configuration dialog, not shown, on the display 222 of the communication terminal 201. On the print settings configuration dialog, the user can select a printer which is to execute printing and set the number of print copies and so forth. Further, on the print settings configuration dialog, the user can start a printer driver associated with the selected printer, and configure details of settings, such as a stapling setting and a double-sided print setting. By registering the MFP 101 in the communication terminal 201 in advance, the MFP 101 can be selected by a user on the print settings configuration dialog. After completing selection of a printer to execute printing and configuration of the print settings, such as the number of print copies, on the print settings configuration dialog, the user 2 presses the "print start" button on the print settings configuration dialog to start printing. When it is detected that the "print start" button on the print settings configuration dialog has been pressed, the video conference application of the communication terminal 201 transmits the print start notification to the chat system server 400.

Referring again to FIG. 14, if it is determined in the step S1404 that the chat system server 400 has received the print start notification from the communication terminal 201, the process proceeds to a step S1405.

In the step S1405, the chat system server 400 posts a message that printing of the attached file has been started to a user of the print notification destination (the user 1 in the example in FIG. 7A) (corresponding to the step S712 in FIG. 7A).

Next, in a step S1406, the chat system server 400 transmits the attached file designated in the print start notification to the communication terminal 201 as a response to the print start notification received from the communication terminal 201 (corresponding to the step S714 in FIG. 7A).

Next, in a step S1407, the chat system server 400 determines whether or not a print completion notification transmitted from the communication terminal 201 in the step S718 in FIG. 7A has been received. The print completion notification is sent when printing of the attached file by the MFP 101 is completed.

Here, the process after the MFP 101 starts printing of the attached file until the communication terminal 201 transmits the print completion notification to the chat system server 400 will be described.

After the print start notification is sent from the communication terminal 201 to the chat system server 400, the video conference application of the communication terminal 201 waits until the communication terminal 201 receives the attached file transmitted from the chat system server 400 as a response to the print start notification. After that, when the communication terminal 201 receives the attached file, the video conference application of the communication terminal 201 submits a print job based on the print settings set on the print settings configuration dialog (corresponding to the step S715 in FIG. 7A). Here, since the MFP 101 is selected as the printer on the print settings configuration dialog, the print job is submitted to the MFP 101.

When the print job is submitted from the communication terminal 201, the MFP 101 starts the process for printing the attached file according to the print settings (corresponding to the step S716 in FIG. 7A). After the print job is submitted from the communication terminal 201 to the MFP 101, the video conference application of the communication terminal 201 periodically inquires the MFP 101 about whether or not the input print job is completed. In response to this inquiry, if a job completion notification is received from the MFP 101 (corresponding to the step S717 in FIG. 7A), the video conference application of the communication terminal 201 transmits the print completion notification from the communication terminal 201 to the chat system server 400 (corresponding to the step S718 in FIG. 7A).

Referring again to FIG. 14, if it is determined in the step S1407 that the job completion notification is received from the communication terminal 201, the chat system server 400 proceeds to a step S1408.

In the step S1408, the chat system server 400 posts a message that printing of the attached file has been completed to the print notification destination user (the user 1 in the example in FIG. 7A) (corresponding to the step S719 in FIG. 7A), followed by terminating the present process.

As described above, according to the present embodiment, the presenter of the video conference can know that attendees have completed printing without providing a print instruction and cause the video conference to smoothly progress.

Although in the present embodiment, the description is given of the example in which a print job for printing an attached file is directly submitted from the communication terminal 201 to the MFP 101 as a local printer, the method of submitting a print job is not limited to this insofar as the above-mentioned print job can be submitted from the communication terminal 201 to the MFP 101. For example, a print job may be submitted from the communication terminal 201 to a print server, not shown, and the print job may be submitted from the print server to the MFP 101. Further, the print server may be a server connected to the network 100, or a cloud print server, such as Google Cloud Print or UniFLOW. Further, in this case, the print server may transmit the job completion notification to the communication terminal 201 in the step S717.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-197083, filed Nov. 27, 2020, which is hereby incorporated by reference herein in its entirety.

What is claimed is:

1. A video conference system server that manages a video conference performed by using a plurality of communication terminals, comprising:
   a data transmitting unit configured to transmit data uploaded based on an instruction from a first user using a first communication terminal which is one of the plurality of communication terminals, wherein the uploaded data is transmitted from the first communication terminal to a second communication terminal based on an instruction from a second user using the second communication terminal which is another one of the plurality of communication terminals, wherein the data is uploaded in a chat room corresponding to the video conference;
   a print completion notification reception unit configured to receive a print completion notification of the uploaded data from the second communication terminal; and
   posting unit configured to post, in a case where the print completion notification is received, a message indicating that the second user has completed printing of the uploaded data, wherein the posted message is posted to the chat room in which the data is uploaded.

2. The video conference system server according to claim 1, wherein the posted message is hidden based on elapse of a predetermined period.

3. The video conference system server according to claim 1, wherein the second communication terminal includes:
   a generation unit configured to generate a print job for printing the uploaded data;
   a submission unit configured to submit the print job to an image forming apparatus;
   a detection unit configured to detect that the print job has been completed in the image forming apparatus; and
   a transmission unit configured to transmit the print completion notification to the video conference system server when it is detected by the detection unit that the print job is completed.

4. The video conference system server according to claim 1, wherein a notification destination user is mentioned on the posted message.

5. A method of controlling a video conference system server that manages a video conference performed by using a plurality of communication terminals, comprising:
   transmitting data uploaded based on an instruction from a first user using a first communication terminal which is one of the plurality of communication terminals, wherein the uploaded data is transmitted from the first communication terminal to a second communication terminal based on an instruction from a second user using the second communication terminal which is another one of the plurality of communication terminals, wherein the data is uploaded in a chat room corresponding to the video conference;
   receiving a print completion notification of the uploaded data from the second communication terminal; and
   posting, in a case where the print completion notification is received, a message indicating that the second user has completed printing of the uploaded data, wherein the posted message is posted to the chat room in which the data is uploaded.

6. A non-transitory computer-readable storage medium storing a program for causing a computer to execute a method of controlling a video conference system server that manages a video conference performed by using a plurality of communication terminals,
   wherein the method comprises:
   transmitting data uploaded based on an instruction from a first user using a first communication terminal which is one of the plurality of communication terminals, wherein the uploaded data is transmitted from the first communication terminal to a second communication terminal based on an instruction from a second user using the second communication terminal which is another one of the plurality of communication terminals, wherein the data is uploaded in a chat room corresponding to the video conference;
   receiving a print completion notification of the uploaded data from the second communication terminal; and
   posting, in a case where the print completion notification is received, a message indicating that the second user has completed printing of the uploaded data, wherein the posted message is posted to the chat room in which the data is uploaded.

* * * * *